(12) United States Patent
Nakamura et al.

(10) Patent No.: US 11,936,540 B2
(45) Date of Patent: Mar. 19, 2024

(54) SYSTEM DETERMINATION APPARATUS, SYSTEM DETERMINATION METHOD AND SYSTEM DETERMINATION PROGRAM

(71) Applicant: Nippon Telegraph and Telephone Corporation, Tokyo (JP)

(72) Inventors: Mizuto Nakamura, Musashino (JP); Toshihiko Seki, Musashino (JP); Naoyuki Tanji, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/793,867

(22) PCT Filed: Jan. 22, 2020

(86) PCT No.: PCT/JP2020/002084
§ 371 (c)(1),
(2) Date: Jul. 19, 2022

(87) PCT Pub. No.: WO2021/149181
PCT Pub. Date: Jul. 29, 2021

(65) Prior Publication Data
US 2023/0039322 A1 Feb. 9, 2023

(51) Int. Cl.
*H04L 43/062* (2022.01)
*H04L 43/067* (2022.01)
*H04L 43/16* (2022.01)

(52) U.S. Cl.
CPC .......... *H04L 43/062* (2013.01); *H04L 43/067* (2013.01); *H04L 43/16* (2013.01)

(58) Field of Classification Search
CPC ..... H04L 43/062; H04L 43/067; H04L 43/16; H04L 43/08–0817
See application file for complete search history.

(56) References Cited

U.S. PATENT DOCUMENTS

| 10,367,836 | B2 * | 7/2019 | Kang | H04L 43/0817 |
| 10,797,896 | B1 * | 10/2020 | Earl | H04L 43/065 |
| 2017/0063652 | A1 * | 3/2017 | Wu | H04L 43/04 |

(Continued)

FOREIGN PATENT DOCUMENTS

| JP | 2009206698 A | * 9/2009 | ............ H04L 12/56 |
| JP | 2012014673 | 1/2012 | |

(Continued)

*Primary Examiner* — Jerry B Dennison
(74) *Attorney, Agent, or Firm* — Fish & Richardson P.C.

(57) ABSTRACT

A system determination apparatus includes: a calculation unit configured to calculate a variation coefficient representing a degree of variation of traffic and an average traffic amount corresponding to a plurality of days using traffic data of a network apparatus corresponding to the plurality of days; and a determination unit configured to determine a system of the network apparatus using a density of a data group representing a relationship between the variation coefficient and the average traffic amount corresponding to the plurality of days, and the determination unit determines the network apparatus to be a non-operation system in a case where a density of the data group is equal to or higher than a first threshold and determines the network apparatus to be an operation system in a case where the density of the data group is lower than the first threshold.

12 Claims, 10 Drawing Sheets

(56) References Cited

U.S. PATENT DOCUMENTS

2017/0118235 A1* 4/2017 Kang ................. H04L 43/0876
2019/0334823 A1* 10/2019 Rave ..................... H04L 43/16
2022/0131747 A1* 4/2022 Sevindik ................ H04L 1/08

FOREIGN PATENT DOCUMENTS

| WO | WO-2021149181 A1 * | 7/2021 | ........... H04L 43/062 |
| WO | WO-2021149182 A1 * | 7/2021 | ........... H04L 41/142 |

* cited by examiner

SYSTEM DETERMINATION APPARATUS, SYSTEM DETERMINATION METHOD AND SYSTEM DETERMINATION PROGRAM

CROSS-REFERENCE TO RELATED APPLICATIONS

This application is a National Stage application under 35 U.S.C. § 371 of International Application No. PCT/JP2020/002084, having an International Filing Date of Jan. 22, 2020. The disclosure of the prior application is considered part of the disclosure of this application, and is incorporated in its entirety into this application.

TECHNICAL FIELD

The present disclosure relates to a system determination apparatus, a system determination method, and a system determination program that determine a system of a network apparatus.

BACKGROUND ART

A communication carrier operates and manages hundreds of thousands of networks and requires rapid failure recovery in the event of failure. For this reason, a carrier network is basically configured to be redundant, and automatic path switching or path switching by an operator is performed in the event of failure.

In PTL 1, a technology for detecting and restoring a failure of a server in a cluster system in which a plurality of server systems are associated is described.

CITATION LIST

Patent Literature

Patent Literature 1: JP 2012-014673 A

SUMMARY OF THE INVENTION

Technical Problem

A relationship between an operation system and a non-operation system in a network is automatically switched or manually switched as needed, and thus a deviation between configuration information that is managed and the current situation may occur. For example, in a case where an alarm for an instantaneous interruption is received by a management system of a transmission layer, an operator performs package (PKG) resetting or the like as an action for the alarm. At this time, a transmission apparatus may not have information relating to the system of the operation system/non-operation system, and thus there is problem in that an operator may perform an operation such as PKG resetting or the like on an incorrect apparatus or interface, and the service is not restored.

The present disclosure has been made in view of the situation described above, and an object of the present disclosure is to provide a system determination apparatus, a system determination method, and a system determination program that determine whether a network apparatus is operating as an operation system or a non-operation system for a system that is redundantly configured.

Means for Solving the Problem

In order to achieve the object described above, an aspect of the present disclosure includes: a calculation unit configured to calculate a variation coefficient representing a degree of variation of traffic and an average traffic amount corresponding to a plurality of days using traffic data of a network apparatus corresponding to the plurality of days; and a determination unit configured to determine a system of the network apparatus using a density of a data group representing a relationship between the variation coefficient and the average traffic amount corresponding to the plurality of days, in which the determination unit determines the network apparatus to be a non-operation system in a case where a density of the data group is equal to or higher than a first threshold and determines the network apparatus to be an operation system in a case where the density of the data group is lower than the first threshold.

One aspect of the present disclosure is a system determination method performed by a system determination apparatus, the system determination method including: calculating a variation coefficient representing a degree of variation of traffic and an average traffic amount corresponding to a plurality of days using traffic data of a network apparatus corresponding to the plurality of days; and determining a system of the network apparatus using a density of a data group representing a relationship between the variation coefficient and the average traffic amount corresponding to the plurality of days, in which, the determining includes determining the network apparatus to be a non-operation system in a case where a density of the data group is equal to or higher than a first threshold, and determining the network apparatus to be an operation system in a case where the density of the data group is lower than the first threshold.

An aspect of the present disclosure is a system determination program causing a computer to function as the system determination apparatus described above.

Effects of the Invention

According to the present disclosure, a system determination apparatus, a system determination method, and a system determination program that determine whether a network apparatus is operating as an operation system or a non-operation system for a system that is redundantly configured can be provided.

DESCRIPTION OF EMBODIMENTS

Hereinafter, an embodiment of the present disclosure will be described with reference to the drawings.

Figure 1:
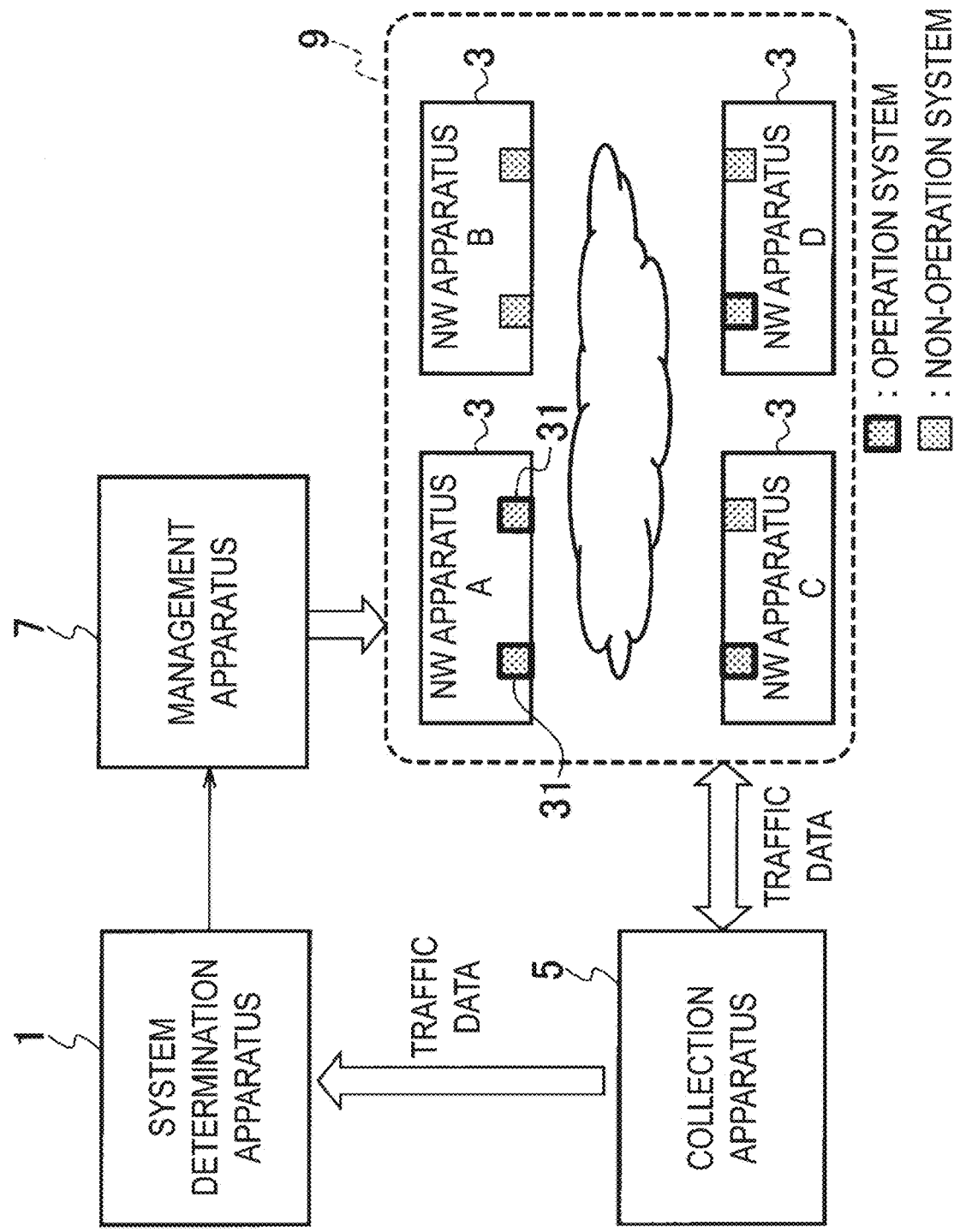
FIG. 1 is a configuration diagram illustrating a system according to an embodiment of the present disclosure.

FIG. 1 is a system configuration diagram illustrating a system according to this embodiment. The system that is illustrated in the drawing includes a network 9, a system determination apparatus 1, a collection apparatus 5, and a management apparatus 7. The network 9 includes a plurality of network apparatuses (NW apparatuses) 3. The NW apparatus 3 according to this embodiment includes a plurality of interface packages (IFs) 31. The IFs 31 are connection units (ports) for transmitting and receiving data between apparatuses.

The system determination apparatus 1 determines whether the NW apparatus 3 and each IF 31 of the NW apparatus 3 is an operation system or a non-operation system. In other words, the system determination apparatus 1 determines whether the NW apparatus 3 or each IF 31 of the NW apparatus 3 is operating as an operation system or a non-operation system. In this embodiment, although a case where the NW apparatus 3 includes a plurality of IFs, and the system determination apparatus 1 determines a system for each IF of the NW apparatus 3 will be described, the system determination apparatus 1 may determine a system of each NW apparatus 3.

The collection apparatus 5 collects traffic data of a plurality of NW apparatuses 3 disposed in the network 9 and transmits the collected traffic data to the system determination apparatus 1. In this embodiment, the collection apparatus 5 collects traffic data for each IF of the NW apparatus 3. The management apparatus 7 manages and operates the network 9. More specifically, the management apparatus 7 stores configuration information of the network 9 and manages the NW apparatus 3 and a communication path (path). In addition, when a failure occurs, the management apparatus 7 switches the NW apparatus 3 or the communication path in which the failure has occurred from the operation system to the non-operation system automatically or in accordance with an instruction from an operator. In addition, the collection apparatus 5 and the management apparatus 7 may be configured as one apparatus (housing).

Figure 2:
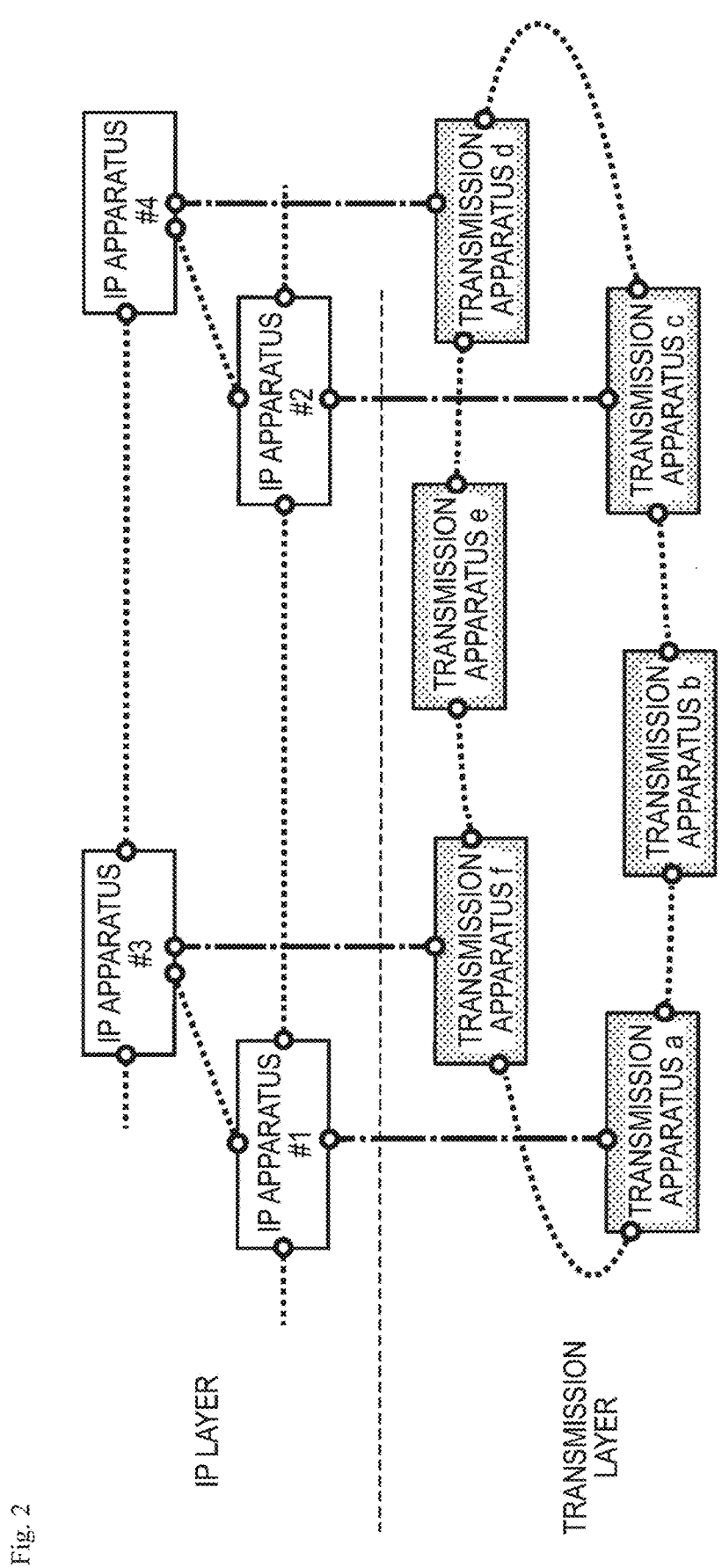
FIG. 2 is a network configuration diagram illustrating an example of a network.

FIG. 2 is a network configuration diagram illustrating a specific example of the network 9 illustrated in FIG. 1. The network that is illustrated in the drawing includes an IP apparatus of an IP layer and a transmission apparatus of a transmission layer as NW apparatuses 3. The NW apparatus 3 is an apparatus that transmits and receives data (packets). The NW apparatus 3 includes apparatuses such as servers, switches, and the like that can transmit and receive data as well as the IP apparatus and the transmission apparatus illustrated in FIG. 2.

Figure 3:
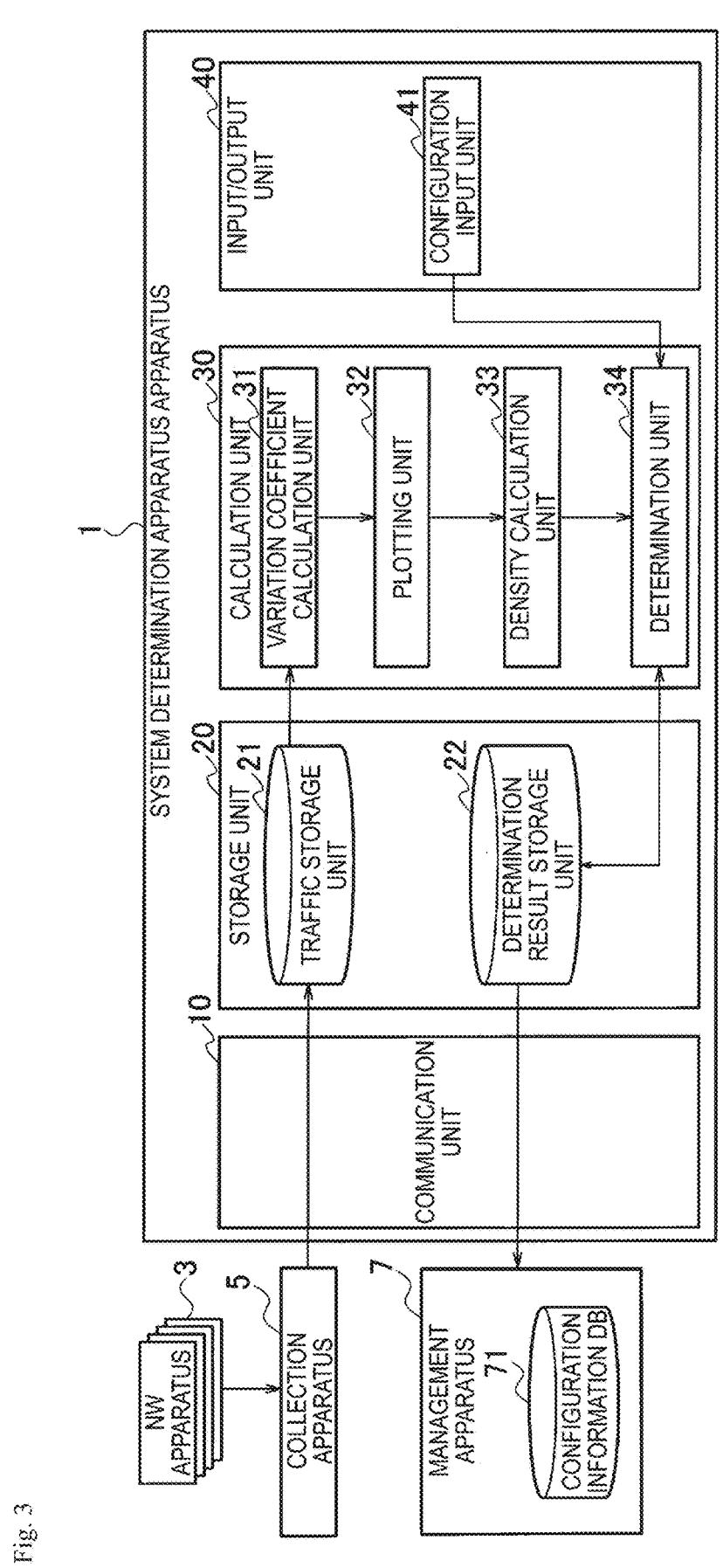
FIG. 3 is a block diagram illustrating a configuration of a system determination apparatus.

FIG. 3 is a block diagram illustrating a configuration of the system determination apparatus 1 according to this embodiment. The system determination apparatus 1 according to this embodiment determines whether each IF of the NW apparatus 3 is an operation system or a non-operation system by using the traffic data of the NW apparatus 3. More specifically, the system determination apparatus 1 classifies the IF of each NW apparatus 3 into an operation system or a non-operation system using a variation coefficient that is an index of a deviation of traffic. The variation coefficient will be described below.

The system determination apparatus 1 illustrated in the drawing includes a communication unit 10, a storage unit 20, a calculation unit 30, and an input/output unit 40. The communication unit 10 transmits/receives data to/from the collection apparatus 5 and the management apparatus 7. More specifically, the communication unit 10 receives traffic data for each IF of each NW apparatus 3 from the collection apparatus 5 and stores the received traffic data in a traffic storage unit 21. In addition, the communication unit 10 transmits determination results stored in a determination result storage unit 22 to the management apparatus 7 in accordance with an instruction from a determination unit 34.

The storage unit 20 includes the traffic storage unit 21 and the determination result storage unit 22. The traffic of the NW apparatus 3 collected by the collection apparatus 5 is stored in the traffic storage unit 22. Determination results (operation system/non-operation system) of systems determined by the determination unit 34 for each IF of the NW apparatus 3 are stored in the determination result storage unit 22.

The calculation unit 30 includes a variation coefficient calculation unit 31, a plotting unit 32, a density calculation unit 33, and a determination unit 34. The variation coefficient calculation unit 31 calculates a variation coefficient representing a degree of variation of traffic and an average traffic amount for a plurality of days using traffic data of each IF of the NW apparatus 3 corresponding to the plurality of days. In this embodiment, the variation coefficient calculation unit 31 calculates a variation coefficient representing a degree of variation of traffic at the period of one day and an average traffic amount corresponding to n days using traffic data of each IF of the NW apparatus 3 corresponding to n days (a plurality of dates).

The plotting unit 32 plots data representing the relationship between the variation coefficient and an average traffic amount corresponding to n days for each IF. The density calculation unit calculates a density of a data group acquired by clustering data of each IF corresponding to n days plotted by the plotting unit 33.

The determination unit 34 determines the system of the IF of the NW apparatus 3 using the density of the data group that represents a relationship between the variation coefficient and the average traffic amount corresponding to n days. More specifically, the determination unit 34 determines the IF of the NW apparatus 3 to be the non-operation system in a case where the density of the data group is equal to or higher than a first threshold and determines the IF to be the operation system in a case where the density of the data group is lower than the first threshold.

In addition, in a case where the density of the data group is equal to or higher than the first threshold, and the average traffic amount of the data group is equal to or larger than a second threshold, the determination unit 34 may determine the IF to be the operation system. In a case where the average traffic amount of the data group is equal to or larger than the second threshold, and the variation coefficient of the data group is smaller than a third threshold, the determination unit 34 may determine the IF to be the non-operation system. In a case where the density of the data group is equal to or higher than the first threshold, the average traffic amount is equal to or larger than the second threshold, and the variation coefficient is equal to or larger than the third threshold, the determination unit 34 may determine that the system of the IF to be a system opposite to the system that has been previously determined.

The input/output unit 40 includes a configuration input unit 41. The configuration input unit 41 receives various configuration information input by an operator. In this embodiment, the configuration input unit 41 receives predetermined thresholds (a first threshold, a second threshold, and a third threshold) input by an operator and transmits the received thresholds to the determination unit 34. The thresholds may be configured in advance in accordance with an operation or may be dynamically configured using machine learning or the like.

Hereinafter, the variation coefficient according to this embodiment will be described.

Figure 4:
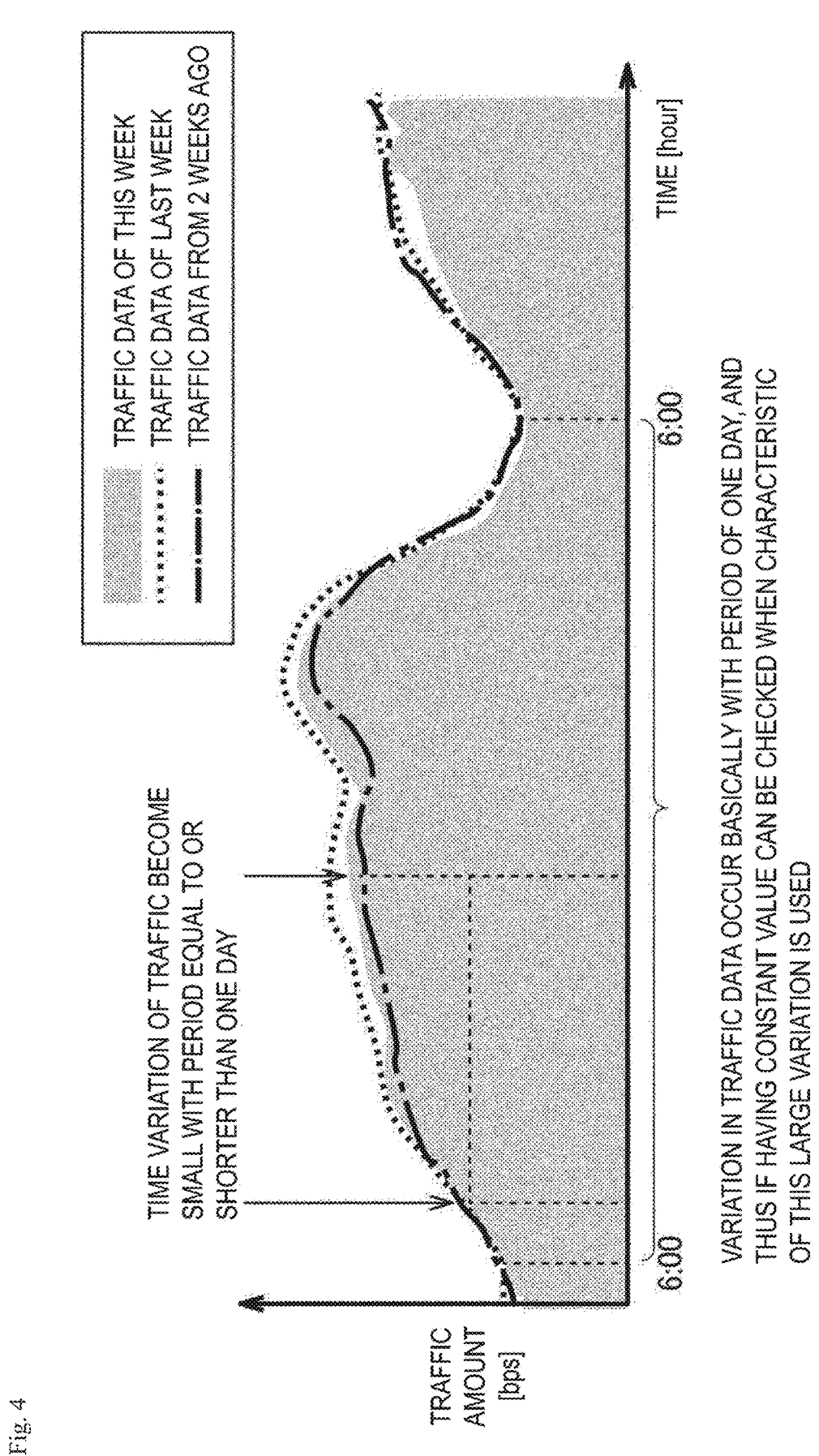
FIG. 4 is a graph illustrating an example of traffic flowing in a network of an operation system.

FIG. 4 is a graph illustrating an example of traffic (an amount of data transferred within a predetermined period of time) flowing through the network of the operation system. The illustrated graph shows traffic (bits/second) from 6 o'clock A.M. on a predetermined day to 12 o'clock on the next day in a carrier network of the operation system. The illustrated graph also shows traffic of days that are one week and two weeks before the predetermined day.

Generally, traffic flowing in a network of the operation system increases over a daytime band, reaches a peak in a nighttime band, and decreases in a late night band. As illustrated in the drawing, the traffic is almost the same on the predetermined day and the days that are one week and two weeks before the predetermined day. Thus, the traffic of the operation system is considered to have a similar time variation at the period of one day. At a period shorter than one day, a time variation of the traffic is small. In contrast, in a network of the non-operation system (not illustrated), the traffic becomes a constant value, and there is no variation according to a time frame.

In this embodiment, it is identified whether each IF of the NW apparatus 3 is the operation system or the non-operation system by using variations of traffic of the period of one day. More specifically, the system determination apparatus 1 determines an IF in which traffic has a constant value or an IF in which a variation of traffic is small to be the non-operation system and determines an IF having a large time variation to be the operation system.

In this embodiment, although variations of traffic at the one-day period are used, variations of traffic at a predetermined period other than the one-day period may be used. For example, variations of traffic in the period of m days (here, m is an integer equal to or greater than 1) may be used.

Figure 5:
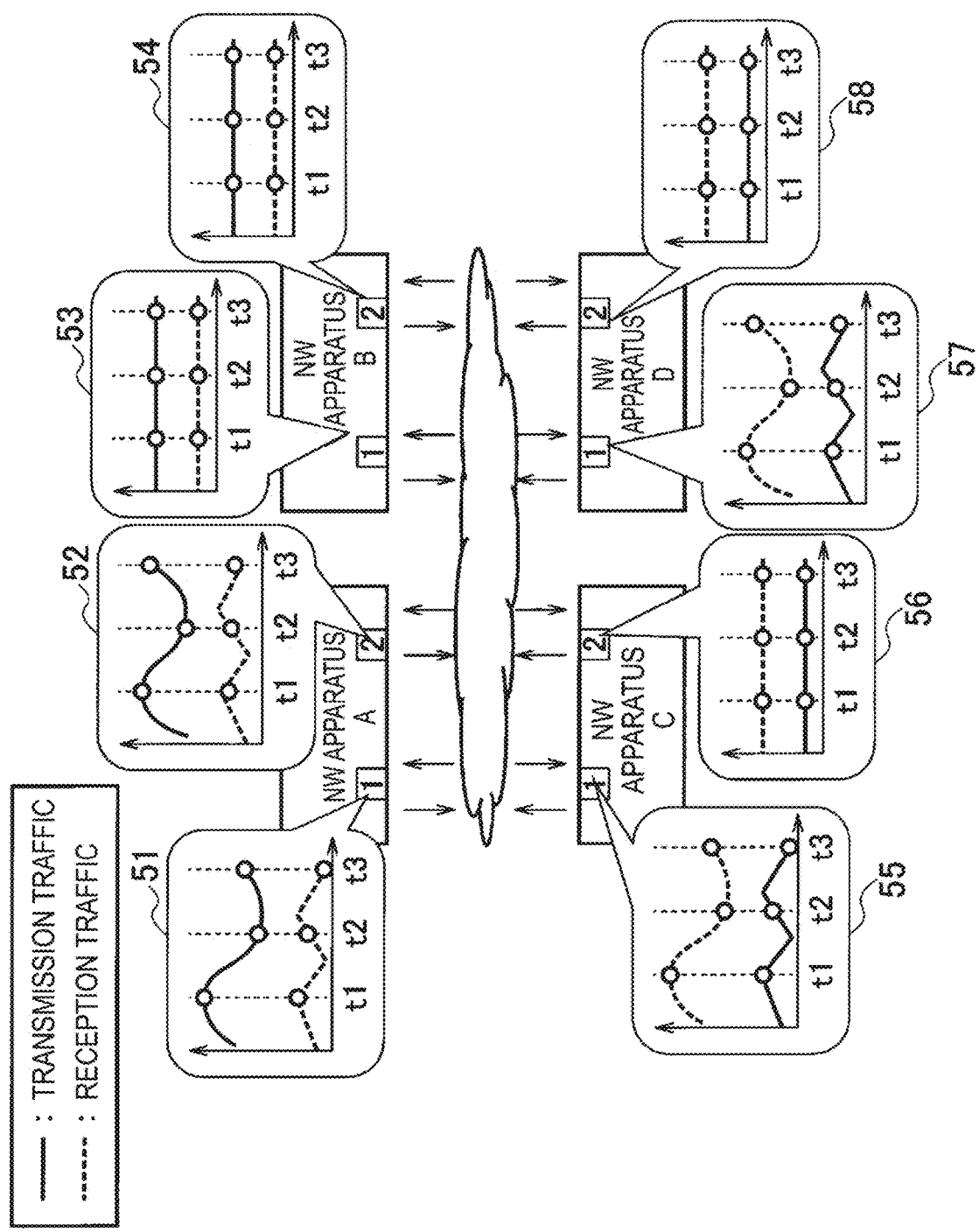
FIG. 5 is a schematic view of one-day traffic of a NW apparatus.

FIG. 5 is a schematic diagram that schematically illustrates traffic (transmission traffic and reception traffic) of one day in each IF of each of the plurality of NW apparatuses 3. In the illustrated example, traffic 51 and 52 of the IFs 1 and 2 of a NW apparatus A, traffic 55 of an IF 1 of a NW apparatus C, and traffic 57 of an IF 1 of a NW apparatus D have large time variations. In addition, for such traffic 51, 52, 55, and 57, both the transmission traffic and reception traffic have large time variations.

On the other hand, there is no time variation in traffic 53 and 54 of IFs 1 and 2 of a NW apparatus B, traffic 56 of an IF 2 of the NW apparatus C, and traffic 58 of an IF 2 of the NW apparatus D. In addition, in such traffic 53, 54, 56, and 58, there is no time variation in transmission traffic or reception traffic.

In order to identify an IF of the operation system or an IF of the non-operation system, it is only required to check whether an IF is an IF in which traffic having time variations similar in a plurality of days flows or an IF in which traffic having no time variation flows. The former is assumed to have various large and small deviations in traffic in the period of one day and similar deviations in a plurality of days. The latter is assumed to have small deviations in traffic (data amount) during one day.

In this embodiment, the following variation coefficient is used as an index of a deviation in traffic.

Variation coefficient=(standard deviation/average traffic amount)

The standard deviation is a value that represents a degree of dispersion of data and is a positive square root of dispersion (the mean square of a difference between each numerical value and a mean value). As the numerical value used for calculating dispersion, for example, like the graph illustrated in FIG. 4, traffic (bits/second) at each time for every predetermined interval is used. The mean value is a mean of the traffic at each time of one day.

Although determination of a system is performed using one of the transmission traffic and the reception traffic of each IF in this embodiment, determination of a system may be performed using both the transmission traffic and the reception traffic.

The variation coefficient calculation unit 31 calculates a variation coefficient and an average traffic amount corresponding to n days for each IF using the traffic data (the transmission traffic or the reception traffic) stored in the traffic storage unit 21. The plotting unit 32 plots data representing the relationship between the variation coefficient and an average traffic amount corresponding to n days for each IF on a graph. The density calculation unit 33 calculates a density of a data group acquired by clustering data corresponding to n days for each IF plotted by the plotting unit 32.

Figure 6:
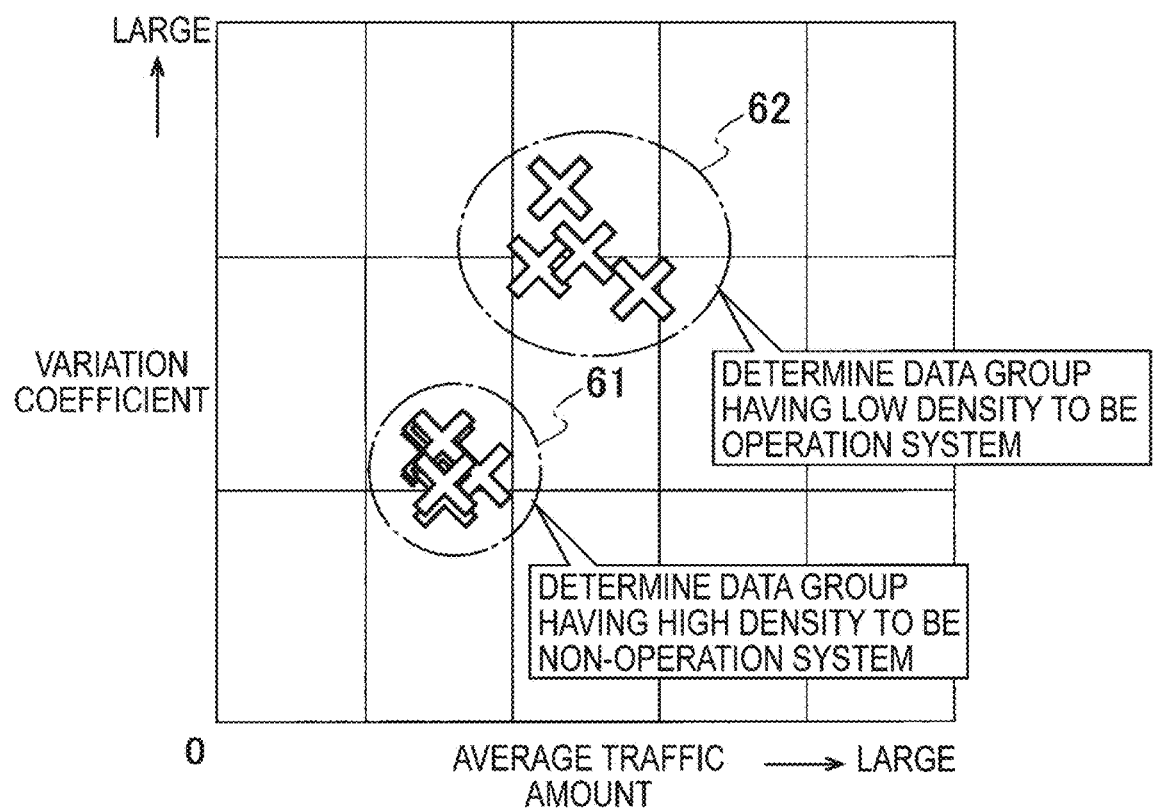
FIG. 6 is an example of a data group for plotting a relationship between a variation coefficient and an average traffic amount.

FIG. 6 is an example of a graph in which relationships between a variation coefficient and an average traffic amount in an operation system IF and a non-operation system IF are plotted. In the non-operation system IF, when data representing a relationship between an average traffic amount and a variation coefficient corresponding to n days is plotted, data of each data group 61 is densely aggregated. In addition, in the non-operation system IF, there is a small deviation in traffic at a one-day period, and thus the variation coefficient is small. On the other hand, in the operation system IF, when data representing a relationship between an average traffic amount and a variation coefficient corresponding to n days is plotted, basically, data of the data group 62 is not densely aggregated.

The density calculation unit 33 performs clustering of the plotted data for each IF using a group mean method, a mixed Gaussian distribution, or the like and calculates a density. The density is an index that represents a degree of dense aggregation of data in a data group. Dense aggregation of data means that a distance between pieces of data is short (short distance). The density calculation unit 33 calculates a density of a data group, for example, by using a Euclidean distance, a Chebyshev distance, or the like. Then, the determination unit 34 identifies whether each IF is the operation system or the non-operation system using at least the density. More specifically, the determination unit 34 determines an IF of which a density of the data group is equal to or higher than a first threshold to be the non-operation system and determines an IF of which a density of the data group is lower than the first threshold to be the operation system. An operator inputs the first threshold, which is a predetermined threshold, to the system determination apparatus 1 using the configuration input unit 41.

However, as an exceptional process, even in the case of a data group having a high density, an IF having a large average traffic amount, an IF having a large variation coefficient, and an IF in which both the average traffic amount and the variation coefficient are large are determined to be operation system IFs in which traffic having a similar time variation during n days flows. In other words, in a case where the density of a data group is equal to or higher than the first threshold and in a case where the average traffic amount of the data group is equal to or larger than a second threshold, the determination unit 34 determines that the IF is the operation system.

In the non-operation system IF, traffic (several hundreds of Mbps) of IP re-broadcasting of terrestrial digital broadcasting may flow. In such a case, there is a possibility of the average traffic amount being equivalent to that of the operation system IF in a region in which a traffic flow rate is low. In other words, even in a non-operation system IF, the average traffic amount may be large. For this, the determination unit 34 determines the operation system IF or the non-operation system IF using the variation coefficient. More specifically, the determination unit 34 identifies a data group having a large average traffic amount and a small variation coefficient to be the non-operation system IF and identifies a group having a large average traffic amount and a large variation coefficient to be the operation system IF. More specifically, in a case where the average traffic amount of a data group is equal to or larger than the second threshold and a case where the variation coefficient of the data group is smaller than the third threshold, the determination unit 34 determines that the IF is the non-operation system. An operator inputs a second threshold and a third threshold that are predetermined thresholds to the system determination apparatus 1 using the configuration input unit 41.

For comparison between the average traffic amount of the data group and the second threshold, for example, one of average traffic amounts (for example, a minimum average traffic amount, a maximum average traffic amount, an average value of an average traffic amount, and the like) of each piece of data in the data group is used. In addition, for comparison between the variation coefficient of the data group and the third threshold, for example, one of variation coefficients (for example, a minimum variation coefficient, a maximum variation coefficient, an average value of variation coefficients, and the like) of each piece of data of the data group is used.

Figure 7:
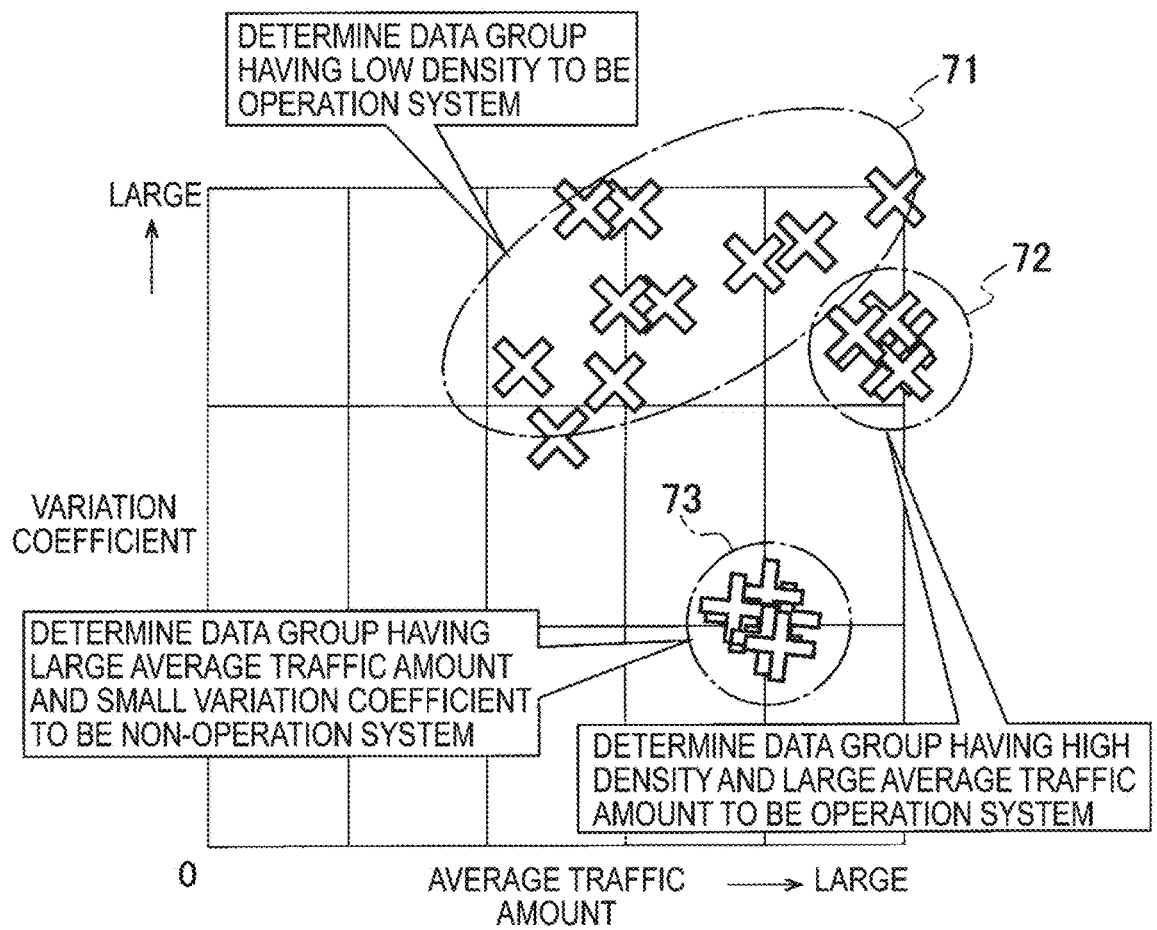
FIG. 7 is a graph illustrating three IF data groups.

FIG. 7 is a graph representing data groups of three IFs. The determination unit 34 determines an IF of a data group 71 having a low density to be the operation system. The determination unit 34 determines a data group 72 having a high density and a large average traffic amount to be the operation system. The determination unit 34 determines a data group 73 having a high density, a large average traffic amount, and a small variation coefficient to be the non-operation system.

Figure 8:
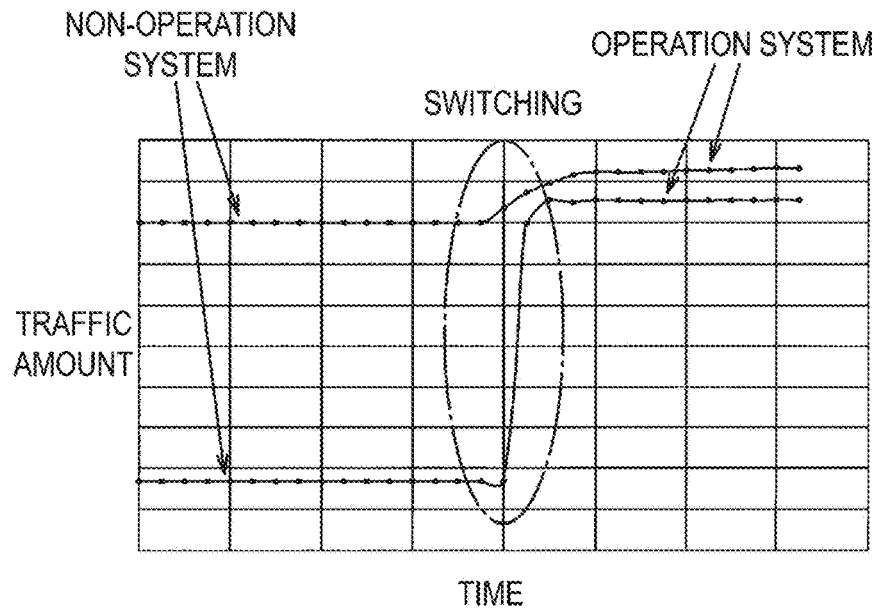
FIG. 8 is an explanatory diagram for describing a determination method in a case where a system is switched in the middle.
Figure 8:
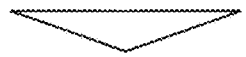
Figure 8:
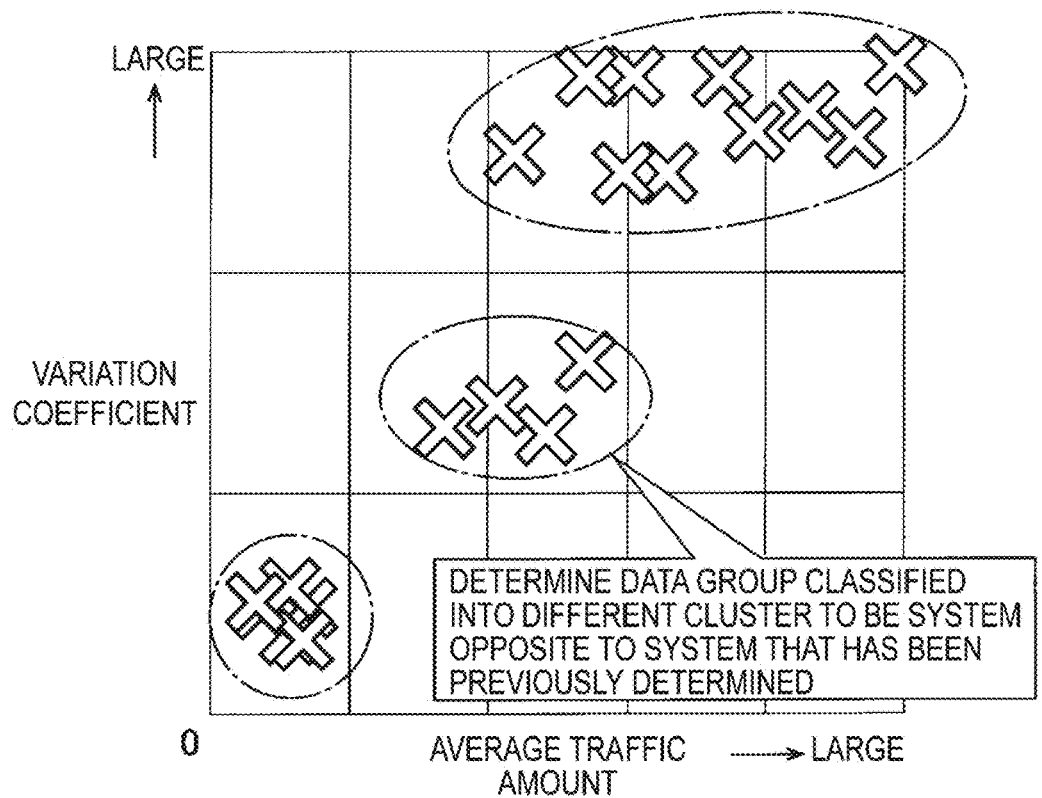

FIG. 8 is an explanatory diagram illustrating a determination method in a case where the system is switched in the middle. By performing switching between the operation system/the non-operation system, traffic operating as the operation system IF and traffic operating as the non-operation system IF are mixed in traffic data corresponding to n days in a certain IF. In addition, on a day on which switching is performed, time variations corresponding to one day have neither characteristics of the operation system nor characteristics of the non-operation system. In this case, it is difficult to determine a system using a determination method that uses the density of the data group, the average traffic amount, and the variation coefficient described above. In other words, when system switching is performed, the density of the data group, the average traffic amount, and the variation coefficient become ambiguous.

In this case, the determination unit 34 determines that the system of the IF is a data group of a clustering different from the data group described above. In this case, the determination unit 34 determines that the IF is a system that is opposite to a system that has been previously determined (the operation system or the non-operation system) by referring to the determination result storage unit 22. More specifically, in a case where the density of the data group is equal to or higher than the first threshold, the average traffic amount is equal to or larger than the second threshold, and the variation coefficient is equal to or larger than the third threshold, the determination unit 34 determines the system of the IF to be a system that is opposite to the previously determined system stored in the determination result storage unit 22.

Hereinafter, an operation of the system determination apparatus 1 according to this embodiment will be described.

Figure 9:
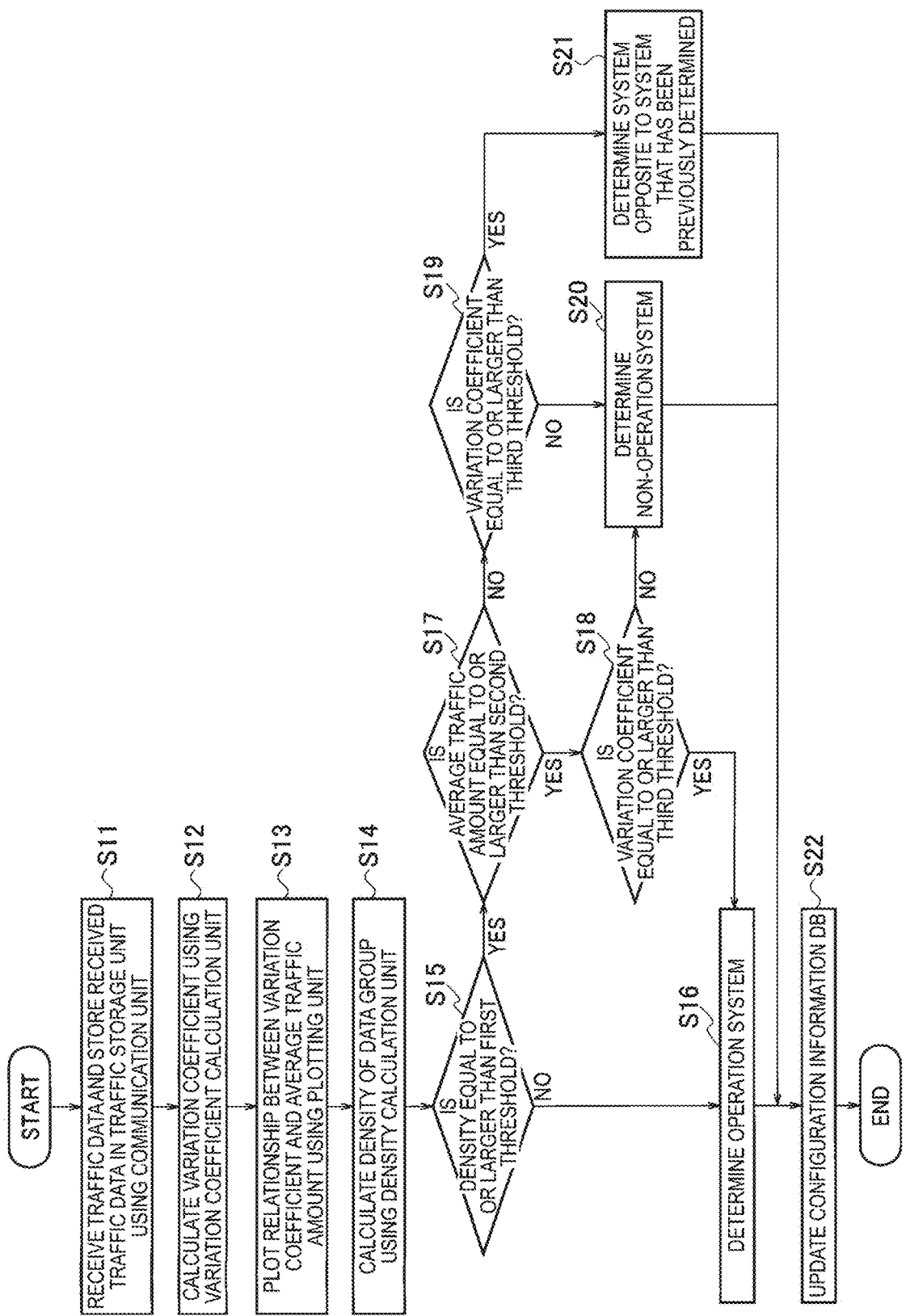
FIG. 9 is a flowchart illustrating an operation of a system determination apparatus.

FIG. 9 is a flowchart illustrating the operation of the system determination apparatus 1. The system determination apparatus 1 receives traffic data for each of IFs of all the NW apparatuses 3 from the collection apparatus 5 and stores the received traffic data in the traffic storage unit 21 (S11). The collection apparatus 5 constantly collects traffic for each IF of the NW apparatus 3 at a predetermined interval and transmits data of the collected traffic to the system determination apparatus 1.

The system determination apparatus 1 performs a process of S12 and subsequent steps for each IF of each NW apparatus 3. The system determination apparatus 1 may perform the process of S12 and subsequent steps on an IF of a NW apparatus relating to a timing at which a failure has occurred in the network or may automatically perform the process regularly on each of IFs of all the NW apparatuses 3.

The system determination apparatus 1 reads traffic data of the IF corresponding to n days (a plurality of days) from the traffic storage unit 21 and calculates a variation coefficient representing a degree of variation of traffic at the period of one day and an average traffic amount corresponding to n days using the traffic data (S12). As the traffic data, at least any one of transmission traffic and reception traffic may be used.

The system determination apparatus 1 plots data corresponding to n days representing a relationship between the variation coefficient and the average traffic amount on a graph (S13). The system determination apparatus 1 performs clustering of the plotted data corresponding to n days as a data group and n and calculates a density of the data group (S14).

The system determination apparatus 1 determines whether the system of the IF is the operation system or the non-operation system using the density of the data group. More specifically, the system determination apparatus 1 determines whether the density of the data group is equal to or higher than the first threshold (S15). In accordance with a determination that the density is lower than the first threshold (S15: No), the system determination apparatus 1 determines the IF to be the operation system and stores the determination result in the determination result storage unit 22 (S16).

In accordance with a determination that the density is equal to or higher than the first threshold (S15: Yes), the system determination apparatus 1 determines whether the average traffic amount is equal to or larger than the second threshold (S17). In accordance with a determination that the average traffic amount is equal to or larger than the second threshold (S17: Yes), the system determination apparatus 1 determines whether the variation coefficient is equal to or larger than the third threshold (S18). In accordance with a determination that the variation coefficient is equal to or larger than the third threshold (S18: Yes), the system determination apparatus 1 determines that the IF is the operation system and stores the determination result in the determination result storage unit 22 (S16). In accordance with a determination that the variation coefficient is smaller than the third threshold (S18: No), the system determination apparatus 1 determines that the IF is the non-operation system and stores the determination result in the determination result storage unit 22 (S20).

In accordance with a determination that the average traffic amount is smaller than the second threshold (S17: No), the system determination apparatus 1 determines whether the variation coefficient is equal to or larger than the third threshold (S19). In accordance with a determination that the variation coefficient is smaller than the third threshold (S19: No), the system determination apparatus 1 determines that the IF is the non-operation system and stores the determination result in the determination result storage unit 22 (S20).

In accordance with a determination that the variation coefficient is equal to or larger than the third threshold (S19: Yes), the system determination apparatus 1 determines a different data group according to system switching. In this case, the system determination apparatus 1 reads a nearest system of the IF by referring to the determination result storage unit 22, determines a system opposite to the nearest system, and stores the determination result in the determination result storage unit 22 (S21). For example, in a case where the nearest system is the operation system, the system determination apparatus 1 determines that the IF is the non-operation system that is opposite to the operation system.

Then, the system determination apparatus 1 updates the configuration information DB of the management apparatus (S22) using the determination results (S16, S20, and S21). More specifically, the system determination apparatus 1 transmits the determination results to the management apparatus 7 and updates the configuration information DB 71.

The system determination apparatus 1 according to this embodiment described above includes a calculation unit 31 that calculates a variation coefficient representing a degree of variation of traffic at the period of one day and an average traffic amount corresponding to a plurality of days using traffic data of an IF of a NW apparatus 3 corresponding to the plurality of days and a determination unit 34 that determines a system of the network apparatus using a density of a data group representing a relationship between a variation coefficient and an average traffic amount corresponding to a plurality of days, and the determination unit 34 determines the network apparatus to be a non-operation system in a case where the density of the data group is equal to or higher than a first threshold and determines the network apparatus to be an operation system in a case where the density of the data group is lower than the first threshold.

In this embodiment, the traffic data of the operation system, generally, rises in a daytime band, reaches a peak in a night time band, and decreases in a late night band, and data of the non-operation system scarcely changes, and thus, the operation system or the non-operation system is determined by performing clustering of data as a group based on a relationship between data of a variation coefficient corresponding to n days that is an index of a deviation of data of a traffic amount of each IF and an average traffic amount. In this way, in this embodiment, it can be determined whether the IF of the NW apparatus 3 is operating as the operation system or the non-operation system even in a case where automatic switching or manual switching of the network is performed, and a deviation occurs between management information and a current status in the operation system. Thus, when a failure has occurred, a situation in which an operator performs an operation such as PKG resetting or the like on an incorrect apparatus or interface, and the service is not restored can be avoided.

Additionally, in this embodiment, in a case where a density of the data group is equal to or higher than the first threshold and a case where an average traffic amount of the data group described above is equal to or larger than the second threshold, the IF is determined to be the operation system. Thus, in this embodiment, even in the case of a data groups having a high density, an IF having a large average traffic amount can be determined to be an operation system IF in which traffic of a time variation that is similar during n days flow.

In this embodiment, in a case where the average traffic amount of the data group is equal to or larger than the second threshold and a case where the variation coefficient of the data group described above is smaller than the third threshold, the IF is determined to be the non-operation system. In accordance with this, according to this embodiment, a non-operation system can be identified even in a case where a large amount of traffic flows also in the non-operation system. In this embodiment, instead of determining the operation system or the non-operation system using only a traffic amount, the system is determined using the density and the variation coefficient. Thus, according to this embodiment, a system can be determined with high accuracy even in the case of a non-operation system having a high traffic amount such as a case where traffic of IP re-broadcasting of terrestrial digital broadcasting or the like flows for minimizing a packet loss accompanying switching also in the non-operation system.

Figure 10:
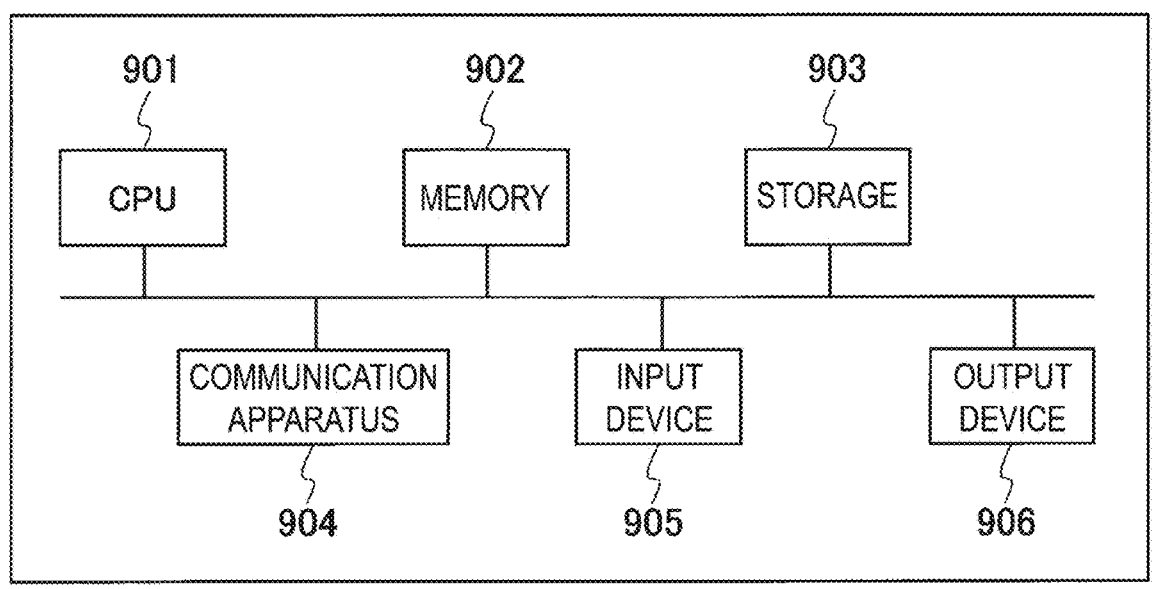
FIG. 10 is an example of a hardware configuration.

As the system determination apparatus 1 described above, for example, a general-purpose computer system as illustrated in FIG. 10 can be used. The illustrated computer system includes a central processing unit (CPU, processor) 901, a memory 902, a storage 903 (hard disk drive: HDD, solid state drive: SSD), a communication apparatus 904, an input device 905, and an output device 906. The memory 902 and the storage 903 are storage apparatuses. In this computer system, each function of the system determination apparatus 1 is realized by the CPU 901 executing a program for the system determination apparatus 1 that is loaded on the memory 902.

The system determination apparatus 1 may be implemented on one computer or may be implemented on a plurality of computers. Also, the system determination apparatus 1 may be a virtual machine implemented on a computer.

The program for the system determination apparatus 1 may be stored in a computer-readable recording medium such as a HDD, a SSD, a universal serial bus (USB) memory, a compact disc (CD), or a digital versatile disc (DVD) or may be distributed via a network.

The present disclosure is not limited to the above-described embodiments and modifications, and various modifications may be made within the scope of the gist of the present disclosure. For example, in the embodiment described above, although the system determination apparatus 1 determines whether each IF of the NW apparatus 3 is an operation system or a non-operation system, the system determination apparatus 1 may determine the system of the NW apparatus 3.

REFERENCE SIGNS LIST

1 System determination apparatus
10 Communication unit

21 Traffic storage unit
21 Determination result storage unit
31 Variation coefficient calculation unit
32 Plotting unit
33 Density calculation unit
34 Determination unit
41 Configuration input unit
3 NW apparatus
5 Collection apparatus
7 Management apparatus

The invention claimed is:

1. A system determination apparatus comprising:
a calculation unit, implemented using one or more computing devices, configured to calculate (i) a variation coefficient representing a degree of variation of traffic and (ii) an average traffic amount corresponding to a plurality of days using traffic data of a network apparatus corresponding to the plurality of days; and
a determination unit, implemented using one or more computing devices, configured to determine a system of the network apparatus using a density of a data group representing a relationship between the variation coefficient and the average traffic amount corresponding to the plurality of days,
wherein the determination unit is configured to determine the system of the network apparatus to be (i) a non-operation system based on the density of the data group being equal to or greater than a first threshold and (ii) an operation system based on the density of the data group being less than the first threshold,
wherein the determination unit is configured to determine that the system of the network apparatus is opposite of a previously determined system based on (i) the density of the data group being equal to or greater than the first threshold, (ii) the average traffic amount being equal to or greater than a second threshold, and (iii) the variation coefficient being equal to or greater than a third threshold and
wherein determining that the system of the network apparatus is the opposite of a previously determined system comprises switching the system of the network apparatus from (i) a previously determined non-operation system to an operation system or (ii) a previously determined operation system to a non-operation system.

2. The system determination apparatus according to claim 1, wherein the determination unit is configured to determine the system of the network apparatus to be the operation system based on (i) the density of the data group being equal to or greater than the first threshold and (ii) the average traffic amount of the data group being equal to or greater than the second threshold.

3. The system determination apparatus according to claim 2, wherein the determination unit is configured to determine the system of the network apparatus to be the non-operation system based on (i) the average traffic amount of the data group being equal to or greater than the second threshold and (ii) the variation coefficient of the data group being less than the third threshold.

4. The system determination apparatus according to claim 1,
wherein the calculation unit is configured to calculate a variation coefficient and an average traffic amount of each interface corresponding to the plurality of days using traffic data for each interface of the network apparatus, and
wherein the determination unit is configured to determine a system for the each interface of the network apparatus.

5. A system determination method performed by a system determination apparatus, the system determination method comprising:
calculating (i) a variation coefficient representing a degree of variation of traffic and (ii) an average traffic amount corresponding to a plurality of days using traffic data of a network apparatus corresponding to the plurality of days; and
determining a system of the network apparatus using a density of a data group representing a relationship between the variation coefficient and the average traffic amount corresponding to the plurality of days,
wherein determining the system of the network apparatus includes:
determining the system of the network apparatus to be (i) a non-operation system based on the density of the data group being equal to or greater than a first threshold and (ii) an operation system based on the density of the data group being less than the first threshold, and
determining that the system of the network apparatus is opposite of a previously determined system based on (i) the density of the data group being equal to or greater than the first threshold, (ii) the average traffic amount being equal to or greater than a second threshold, and (iii) the variation coefficient being equal to or greater than a third threshold, and
wherein determining that the system of the network apparatus is the opposite of a previously determined system comprises switching the system of the network apparatus from (i) a previously determined non-operation system to an operation system or (ii) a previously determined operation system to a non-operation system.

6. A non-transitory computer readable medium having stored thereon a system determination program causing a computer to execute operations comprising:
calculating (i) a variation coefficient representing a degree of variation of traffic and (ii) an average traffic amount corresponding to a plurality of days using traffic data of a network apparatus corresponding to the plurality of days; and
determining a system of the network apparatus using a density of a data group representing a relationship between the variation coefficient and the average traffic amount corresponding to the plurality of days,
wherein determining the system of the network apparatus includes:
determining the system of the network apparatus to be (i) a non-operation system based on a density of the data group being equal to or greater than a first threshold and (ii) an operation system based on the density of the data group being less than the first threshold, and
determining that the system of the network apparatus is opposite of a previously determined system based on (i) the density of the data group being equal to or greater than the first threshold, (ii) the average traffic amount being equal to or greater than a second threshold, and (iii) the variation coefficient being equal to or greater than a third threshold, and
wherein determining that the system of the network apparatus is the opposite of a previously determined system comprises switching the system of the network apparatus from (i) a previously determined non-operation system to an operation system or (ii) a previously determined operation system to a non-operation system.

7. The non-transitory computer readable medium according to claim 6, wherein determining the system of the network apparatus includes determining the system of the network apparatus to be the operation system based on (i) the density of the data group being equal to or greater than the first threshold and (ii) the average traffic amount of the data group being equal to or greater than the second threshold.

8. The non-transitory computer readable medium according to claim 7, wherein determining the system of the network apparatus includes determining the system of the network apparatus to be the non-operation system based on (i) the average traffic amount of the data group being equal to or greater than the second threshold and (ii) the variation coefficient of the data group being less than the third threshold.

9. The non-transitory computer readable medium according to claim 6, wherein the operations further comprise:
  calculating a variation coefficient and an average traffic amount of each interface corresponding to the plurality of days using traffic data for each interface of the network apparatus, and
  determining a system for the each interface of the network apparatus.

10. The system determination method according to claim 5, wherein determining the system of the network apparatus includes determining the system of the network apparatus to be the operation system based on (i) the density of the data group being equal to or greater than the first threshold and (ii) the average traffic amount of the data group being equal to or greater than the second threshold.

11. The system determination method according to claim 10, wherein determining the system of the network apparatus includes determining the system of the network apparatus to be the non-operation system based on (i) the average traffic amount of the data group being equal to or greater than the second threshold and (ii) the variation coefficient of the data group being less than the third threshold.

12. The system determination method according to claim 5, further comprising:
  calculating a variation coefficient and an average traffic amount of each interface corresponding to the plurality of days using traffic data for each interface of the network apparatus, and
  determining a system for the each interface of the network apparatus.

* * * * *